(12) United States Patent
Zhang et al.

(10) Patent No.: US 10,595,331 B2
(45) Date of Patent: Mar. 17, 2020

(54) METHOD FOR TRANSMITTING COMMON MESSAGE AND RELATED DEVICE

(71) Applicant: Huawei Technologies Co., Ltd., Shenzhen (CN)

(72) Inventors: Xiangdong Zhang, Beijing (CN); Jinhuan Xia, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/812,939

(22) Filed: Nov. 14, 2017

(65) Prior Publication Data

US 2018/0070376 A1   Mar. 8, 2018

Related U.S. Application Data

(63) Continuation of application No. PCT/CN2015/079041, filed on May 15, 2015.

(51) Int. Cl.
*H04W 72/12* (2009.01)
*H04W 48/12* (2009.01)
(Continued)

(52) U.S. Cl.
CPC ....... *H04W 72/1278* (2013.01); *H04W 48/08* (2013.01); *H04W 48/12* (2013.01);
(Continued)

(58) Field of Classification Search
CPC combination set(s) only.
See application file for complete search history.

(56) References Cited

U.S. PATENT DOCUMENTS 9,088,914 B2 * 7/2015 Yoshizawa ............... H04W 4/08
9,313,781 B2 * 4/2016 Park ..................... H04W 72/121
(Continued)

FOREIGN PATENT DOCUMENTS

| CN | 102869113 A | 1/2013 |
|---|---|---|
| CN | 103155680 A | 6/2013 |

(Continued)

OTHER PUBLICATIONS

3GPP TS 36.212 V12.4.0, 3rd Generation Partnership Project;Technical Specification Group Radio Access Network; Evolved Universal Terrestrial Radio Access (E-UTRA); Multiplexing and channel coding(Release 12), Technical Specification, Mar. 2015, 94 pages.

(Continued)

*Primary Examiner* — Hicham B Foud
(74) *Attorney, Agent, or Firm* — Slater Matsil, LLP

(57) ABSTRACT

A method for transmitting a common message includes determining, by a base station, a first transmission configuration. The first transmission configuration includes a group of transmission parameters and a moment for using the group of transmission parameters. The group of transmission parameters includes a control channel scheduling indication that is used to indicate whether to use a control channel to schedule and send a common message. The method further includes transmitting, by the base station, the common message to a machine type communication (MTC) device according to the control channel scheduling indication.

18 Claims, 3 Drawing Sheets

A base station determines a first transmission configuration — 101

The base station transmits a common message to a target MTC device according to the first transmission configuration — 102

(51) Int. Cl.
*H04W 48/08* (2009.01)
*H04W 74/00* (2009.01)
*H04W 72/04* (2009.01)
*H04W 4/70* (2018.01)
*H04W 28/02* (2009.01)

(52) U.S. Cl.
CPC ..... *H04W 72/0406* (2013.01); *H04W 72/121* (2013.01); *H04W 74/006* (2013.01); *H04W 4/70* (2018.02); *H04W 28/0215* (2013.01); *H04W 72/1289* (2013.01)

(56) References Cited

U.S. PATENT DOCUMENTS

| | | | |
|---|---|---|---|
| 9,516,669 B2* | 12/2016 | Chen | H04W 68/025 |
| 2009/0251315 A1* | 10/2009 | Lee | H04W 4/06 |
| | | | 340/540 |
| 2010/0178895 A1* | 7/2010 | Maeda | H04W 4/90 |
| | | | 455/404.1 |
| 2010/0272004 A1* | 10/2010 | Maeda | H04L 5/0007 |
| | | | 370/312 |
| 2011/0261777 A1* | 10/2011 | Maeda | H04W 48/20 |
| | | | 370/329 |
| 2013/0015953 A1 | 1/2013 | Hsu et al. | |
| 2013/0155864 A1 | 6/2013 | Yoshizawa et al. | |
| 2013/0203406 A1* | 8/2013 | Chuang | H04W 24/10 |
| | | | 455/424 |
| 2013/0286918 A1 | 10/2013 | Park et al. | |
| 2014/0016598 A1* | 1/2014 | Kwon | H04L 5/0023 |
| | | | 370/329 |
| 2014/0153517 A1 | 6/2014 | Chen et al. | |
| 2014/0211750 A1* | 7/2014 | Larsson | H04W 68/02 |
| | | | 370/330 |
| 2015/0055485 A1* | 2/2015 | Kim | H04W 48/12 |
| | | | 370/242 |
| 2015/0103768 A1* | 4/2015 | Chen | H04W 68/025 |
| | | | 370/329 |
| 2015/0365926 A1 | 12/2015 | Long | |
| 2016/0021239 A1 | 1/2016 | Iwai | |
| 2016/0150570 A1 | 5/2016 | Wang et al. | |
| 2016/0269163 A1 | 9/2016 | Wong et al. | |
| 2017/0086130 A1 | 3/2017 | Zhang | |
| 2017/0142560 A1* | 5/2017 | Ryu | H04W 4/08 |

FOREIGN PATENT DOCUMENTS

| | | |
|---|---|---|
| CN | 103238363 A | 8/2013 |
| CN | 103378939 A | 10/2013 |
| CN | 104254997 A | 12/2014 |
| CN | 104518843 A | 4/2015 |
| EP | 2809124 A1 | 12/2014 |
| EP | 2950494 A1 | 2/2015 |
| JP | 2016539559 A | 12/2016 |
| WO | 2012157925 A2 | 11/2012 |
| WO | 2014125776 A1 | 8/2014 |
| WO | 2014161464 A1 | 10/2014 |
| WO | 2014206311 A1 | 12/2014 |
| WO | 2015063593 A2 | 5/2015 |

OTHER PUBLICATIONS

3GPP TS 36.331 V12.5.0, 3rd Generation Partnership Project; Technical Specification Group Radio Access Network; Evolved Universal Terrestrial Radio Access (E-UTRA);Radio Resource Control (RRC);Protocol specification (Release 12), Technical Specification, Mar. 2015, 445 pages.

3GPP TS 36.213 V12.5.0, 3rd Generation Partnership Project;Technical Specification Group Radio Access Network; Evolved Universal Terrestrial Radio Access (E-UTRA); Physical layer procedures(Release 12), Technical Specification, Mar. 2015, 239 pages.

Nokia Networks et al., "Paging and RAR Transmissions for MTC", 3GPP TSG-RAN WG2 Meeting #89; R2-150132; Feb. 9-13, 2015, 5 pages, Athens, Greece.

* cited by examiner

METHOD FOR TRANSMITTING COMMON MESSAGE AND RELATED DEVICE

CROSS-REFERENCE TO RELATED APPLICATIONS

This application is a continuation of International Application No. PCT/CN2015/079041, filed on May 15, 2015, the disclosure of which is hereby incorporated by reference in its entirety.

TECHNICAL FIELD

Embodiments of the present invention relate to the field of communications technologies, and more specifically, to a method for transmitting a common message and a related device.

BACKGROUND

Machine-to-machine (M2M) communication mainly studies how to bear an Internet of Things application on a mobile communications network. The M2M communication may also be referred to as machine type communication (MTC). The mobile communications network needs to be optimized or enhanced so that an MTC device can be used. For example, device operating bandwidth may be reduced to reduce costs of the MTC device, or coverage enhancement may be performed to increase network coverage. In terms of reducing the device operating bandwidth, the operating bandwidth of the MTC device may be limited to 1.4 MHz. The coverage enhancement is as follows: A device having a relatively large path loss (for example, a device at a location such as a basement) is provided with coverage enhancement support, so that this type of device having a relatively large path loss can access a network to obtain a service. A signal repetition is one of methods for implementing the enhancement. A quantity of signal repetitions relates to a coverage enhancement requirement. Because different MTC devices are in different environments, coverage enhancement requirements are different. If a value of a coverage enhancement requirement is defined as a coverage enhancement level, coverage enhancement levels of different MTC devices in different environments are different. If a signal repetition is used to implement the enhancement, quantities of signal repetitions that need to be performed on MTC devices having different coverage enhancement levels are different.

SUMMARY

The present invention provides a method for transmitting a common message and a related device, so as to implement flexible repeated sending of the common message.

According to a first aspect, an embodiment of the present invention provides a base station. The base station includes a processor and a transceiver circuit. The processor is configured to determine a first transmission configuration. The first transmission configuration includes one or more groups of transmission parameters and a moment (sometimes also referred to as a timing or a timing point) for using each group of transmission parameters. Each group of transmission parameters includes one or more of the following parameters: a quantity of narrow bands used to send a common message; a location of a narrow band used to send the common message; and a largest transport block size and a control channel scheduling indication that are used to send the common message. The control channel scheduling indication is used to indicate whether to use a control channel to schedule and send the common message. The transceiver circuit is configured to transmit the common message to a target machine type communication (MTC) device according to the first transmission configuration.

With reference to the first aspect, in a first possible implementation of the first aspect, the largest transport block size in the transmission parameters includes a maximum quantity of MTC device identifiers that can be included in the common message.

With reference to the first aspect or the first possible implementation of the first aspect, in a second possible implementation of the first aspect, the transceiver circuit is further configured to send the first transmission configuration to the target MTC device, so that the target MTC device receives the common message according to the first transmission configuration.

With reference to any one of the first aspect or the foregoing possible implementations of the first aspect, in a third possible implementation of the first aspect, the processor is further configured to collect statistics about related information of the target MTC device according to a first time granularity. The processor is configured to determine the first transmission configuration according to a statistical result.

According to a second aspect, an embodiment of the present invention provides a machine type communication (MTC) device, and the MTC device includes: a processor and a transceiver circuit. The processor is configured to determine a first transmission configuration. The first transmission configuration includes one or more groups of transmission parameters and a moment for using each group of transmission parameters. The transmission parameters include one or more of the following parameters: a quantity of narrow bands used by the base station to send the common message; a location of a narrow band used by the base station to send the common message; a largest transport block size and a control channel scheduling indication that are used by the base station to send the common message; and the control channel indication that is used to indicate whether the base station uses the control channel to schedule and send the common message. The transceiver circuit is configured to receive, according to the first transmission configuration, the common message sent by the base station.

With reference to the second aspect, in a first possible implementation of the second aspect, the largest transport block size in the transmission parameters includes a maximum quantity of MTC device identifiers that can be included in the common message.

With reference to the second aspect or the first possible implementation of the second aspect, in a second possible implementation of the second aspect, the processor is configured to determine that the first transmission configuration is the first transmission configuration that is sent by the base station and received by the transceiver circuit.

According to a third aspect, an embodiment of the present invention provides a method for transmitting a common message. The method includes determining, by a base station, a first transmission configuration, where the first transmission configuration includes one or more groups of transmission parameters and a moment for using each group of transmission parameters. Each group of transmission parameters includes one or more of the following parameters: a quantity of narrow bands used to send the common message; a location of a narrow band used to send the common message; a largest transport block size and a control channel scheduling indication that are used to send the common message; and the control channel scheduling indication that is used to indicate whether to use a control channel to schedule and send the common message. The method also includes transmitting, by the base station, the common message to a target machine type communication (MTC) device according to the first transmission configuration.

With reference to the third aspect, in a first possible implementation of the third aspect, the largest transport block size in the transmission parameters includes a maximum quantity of MTC device identifiers that can be included in the common message.

With reference to the third aspect or the first possible implementation of the third aspect, in a second possible implementation of the third aspect, the method further includes sending, by the base station, the first transmission configuration to the target MTC device, so that the target MTC device receives the common message according to the first transmission configuration.

With reference to any one of the third aspect or the foregoing possible implementations of the third aspect, in a third possible implementation of the third aspect, before the determining, by a base station, a first transmission configuration, the method also includes collecting, by the base station, statistics about related information of the target MTC device according to a first time granularity. The determining, by a base station, the first transmission configuration includes determining, by the base station, the first transmission configuration according to a statistical result.

According to a fourth aspect, an embodiment of the present invention provides a method for transmitting a common message. The method includes determining, by a machine type communication (MTC) device, a first transmission configuration. The first transmission configuration includes one or more groups of transmission parameters and a moment for using each group of transmission parameters. The transmission parameters include one or more of the following parameters: a quantity of narrow bands used by the base station to send the common message; a location of a narrow band used by the base station to send the common message; a largest transport block size and a control channel scheduling indication that are used by the base station to send the common message; and the control channel indication that is used to indicate whether the base station uses the control channel to schedule and send the common message. The method also includes receiving, by the MTC device according to the first transmission configuration, the common message sent by the base station.

With reference to the fourth aspect, in a first possible implementation of the fourth aspect, the largest transport block size in the transmission parameters includes a maximum quantity of MTC device identifiers that can be included in the common message.

With reference to the fourth aspect or the first possible implementation of the fourth aspect, in a second possible implementation of the fourth aspect, the determining, by an MTC device, a first transmission configuration includes receiving, by the MTC device, the first transmission configuration sent by the base station.

According to a fifth aspect, an embodiment of the present invention provides a base station. The base station includes a determining unit and a sending unit. The determining unit is configured to determine a first transmission configuration. The first transmission configuration includes one or more groups of transmission parameters and a moment for using each group of transmission parameters. Each group of transmission parameters includes one or more of the following parameters: a quantity of narrow bands used to send a common message; a location of a narrow band used to send the common message: a largest transport block size and a control channel scheduling indication that are used to send the common message; and the control channel scheduling indication that is used to indicate whether to use a control channel to send the common message. The sending unit is configured to transmit the common message to a target machine type communication (MTC) device according to the first transmission configuration.

With reference to the fifth aspect, in a first possible implementation of the fifth aspect, the largest transport block size in the transmission parameters includes a maximum quantity of MTC device identifiers that can be included in the common message.

With reference to either the fifth aspect or the foregoing possible implementation, in a second possible implementation of the fifth aspect, the sending unit is further configured to send the first transmission configuration to the target MTC device, so that the target MTC device receives the common message according to the first transmission configuration.

With reference to any one of the fifth aspect or the foregoing possible implementations, in a third possible implementation of the fifth aspect, the determining unit is further configured to collect statistics about related information of the target MTC device according to a first time granularity. The determining unit is configured to determine the first transmission configuration according to a statistical result.

According to a sixth aspect, an embodiment of the present invention provides a machine type communication (MTC) device, and the MTC device includes a determining unit and a receiving unit. The determining unit is configured to determine a first transmission configuration. The first transmission configuration includes one or more groups of transmission parameters and a moment for using each group of transmission parameters. The transmission parameters include one or more of the following parameters: a quantity of narrow bands used by the base station to send the common message; a location of a narrow band used by the base station to send the common message; a largest transport block size and a control channel scheduling indication that are used by the base station to send the common message, and the control channel indication that is used to indicate whether the base station uses the control channel to schedule and send the common message. The receiving unit is configured to receive, according to the first transmission configuration, the common message sent by the base station.

With reference to the sixth aspect, in a first possible implementation of the sixth aspect, the largest transport block size in the transmission parameters includes a maximum quantity of MTC device identifiers that can be included in the common message.

With reference to the sixth aspect or the first possible implementation of the sixth aspect, in a second possible implementation of the sixth aspect, the determining unit is configured to determine that the first transmission configuration is the first transmission configuration that is sent by the base station and received by the receiving unit.

According to the foregoing technical solutions, a base station can determine a manner and a parameter that are used to send a common message at a different moment. For example, different transmission parameters may be used at different moments to send the common message. For example, the base station can determine a quantity of narrow bands used to send the common message, a location of a narrow band used to send the common message, a largest transport block size for sending the common message, whether to use a control channel to schedule and send the common message, or the like. Therefore, the base station can flexibly control sending of the common message.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be understood that the technical solutions in the embodiments of the present invention may be applied to M2M communication (or referred to as MTC). The M2M communication may be borne in various communications systems, such as a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, and a Universal Mobile Telecommunications System (UMTS).

An MTC device may also be referred to as user equipment. The MTC device may be a fixed device at a fixed location, or may be a mobile device. The MTC device may communicate with one or more core networks by using a radio access network (RAN).

A base station may be a base transceiver station (BTS) in GSM or CDMA, or may be a NodeB in WCDMA, or may be an eNB or e-NodeB in LTE, and this is not limited in the present invention.

Figure 1:
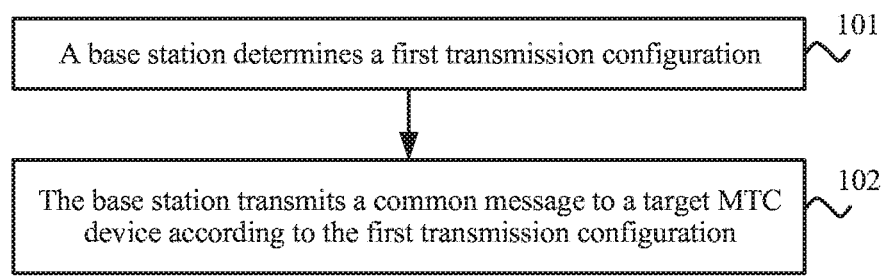
FIG. 1 is a schematic flowchart of a method for transmitting a common message according to an embodiment of the present invention.

FIG. 1 is a schematic flowchart of a method for transmitting a common message according to an embodiment of the present invention.

101. A base station determines a first transmission configuration, where the first transmission configuration includes at least one group of transmission parameters and a moment for using each group of transmission parameters, each group of transmission parameters includes one or more of the following parameters: a quantity of narrow bands used to send the common message, a location of a narrow band used to send the common message, and a largest transport block size and a control channel scheduling indication that are used to send the common message, and the control channel scheduling indication is used to indicate whether to use a control channel to schedule and send the common message.

102. The base station transmits the common message to a target MTC device according to the first transmission configuration.

According to the method shown in FIG. 1, the base station can determine a manner and a parameter that are used to send the common message at a different moment. For example, different transmission parameters may be used at different moments to send the common message. For example, the base station can determine the quantity of the narrow bands used to send the common message, the location of the narrow band used to send the common message, the largest transport block size for sending the common message, whether to use the control channel to schedule and send the common message, or the like. Therefore, the base station can flexibly control sending of the common message.

Specifically, the first transmission configuration includes the at least one group of transmission parameters and the moment for using each group of transmission parameters. A group of transmission parameters may be configured for each possible moment for transmitting the common message. For example, a group of transmission parameters may be configured for each moment for sending a paging message. Alternatively, a group of default transmission parameters may be configured, and a transmission parameter may be configured for one or more moments for sending the common message. In this case, if no transmission parameter is configured for a moment, a default transmission parameter is used to send the common message at the moment. If a transmission parameter is configured for a moment, the transmission parameter corresponding to the moment is used to send the common message at the moment. In this case, the moment corresponding to the use of the default transmission parameter is any moment for which no transmission parameter is configured and that is for transmitting a common message.

Specifically, that the base station transmits the common message to a target MTC device according to the first transmission configuration may include: When the control channel scheduling indication in each group of transmission parameters is positive, the base station sends, according to a moment for sending the common message in each group of transmission parameters, the common message to the target MTC device by using the control channel, for example, schedules and sends a paging message by using the control channel; or when the control channel scheduling indication in each group of transmission parameters is negative, the base station sends the common message to the target device without using the control channel, for example, sends a paging message without using the control channel.

That the base station transmits the common message to a target MTC device according to the first transmission configuration may include: When each group of transmission parameters includes the quantity of the narrow bands used to send the common message, the base station may send the common message on multiple narrow bands according to a requirement. For example, according to one or more parameters of an MTC device identifier, a cell identifier (ID), a paging moment, or a quantity of narrow bands for a common message, the base station sends paging messages for different MTC devices on multiple different narrow bands.

That the base station transmits the common message to a target MTC device according to the first transmission configuration may include: When each group of transmission parameters includes the location of the narrow band used to send the common message, the base station may send the common message on multiple narrow bands according to a requirement. For example, according to one or more parameters of an MTC device identifier, a cell ID, or a paging moment, the base station determines a narrow band for sending a paging message for an MTC device and sends the paging message for the MTC device on the narrow band determined by the base station.

That the base station transmits the common message to a target MTC device according to the first transmission configuration may include: When each group of transmission parameters includes the largest transport block size for sending the common message, the base station ensures that a transport block size of the common message does not exceed the largest transport block size. For example, the base station ensures that a transport block size of a paging message does not exceed the largest transport block size.

Further, the largest transport block size in the transmission parameters includes a maximum quantity of MTC device identifiers that can be included in the common message. Specifically, one RAR message may include multiple MTC device identifiers. One paging message may include multiple MTC device identifiers. Therefore, the largest transport block size for sending the common message may be determined by determining the maximum quantity of MTC device identifiers that are included in the common message.

Further, the method may further include sending, by the base station, the first transmission configuration to the target MTC device. In this way, the target MTC device may receive, according to the first transmission configuration, the common message sent by the base station.

Further, before the base station determines the first transmission configuration, the method may further include: collecting, by the base station, statistics about related information of the target MTC device according to a first time granularity. That a base station determines a first transmission configuration includes: The base station determines the first transmission configuration according to a statistical result. For example, the first time granularity may be a paging message sending interval or a RAR sending interval. For example, a quantity of MTC devices to which paging may be sent at each paging message sending moment may be counted, and the largest transport block size used at each paging moment is determined according to the obtained quantity of the MTC devices.

Further, after the base station sends the common message to the target MTC device according to the first transmission configuration, the method may further include: collecting, by the base station, statistics about related information of the target MTC device according to a first time granularity; updating, by the base station, the first transmission configuration according to a statistical result; and transmitting, by the base station, the common message according to an updated first transmission configuration.

Figure 2:
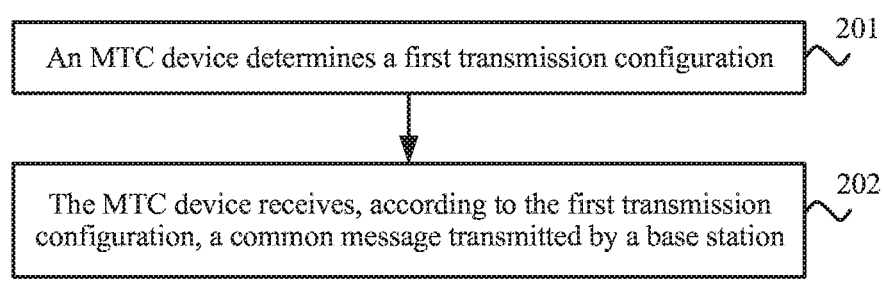
FIG. 2 is a schematic flowchart of a method for transmitting a common message according to an embodiment of the present invention.

FIG. 2 is a schematic flowchart of a method for transmitting a common message according to an embodiment of the present invention.

201. An MTC device determines a first transmission configuration, where the first transmission configuration includes at least one group of transmission parameters and a moment for using each group of transmission parameters, the transmission parameters include one or more of the following parameters: a quantity of narrow bands used by a base station to send the common message, a location of a narrow band used by the base station to send the common message, or a largest transport block size and a control channel scheduling indication that are used by the base station to send the common message, and the control channel indication is used to indicate whether the base station uses a control channel to schedule and send the common message.

202. The MTC device receives, according to the first transmission configuration, the common message transmitted by the base station.

According to the method shown in FIG. 2, the MTC device can determine, according to the first transmission configuration, a manner and a parameter that are used by the base station to send the common message, so that the base station can determine the manner used to send the common message at a different moment and the transmission parameter used to send the common message. Therefore, transmission of the common message is more flexible.

Specifically, that the MTC device receives, according to the first transmission configuration, the common message transmitted by the base station includes: When the control channel indication in each group of transmission parameters is positive, the MTC device receives, by using the control channel, the common message sent by the base station, for example, receives a paging message by using the control channel; or when the control channel indication in each group of transmission parameters is negative, the MTC device receives, without using the control channel, the common message sent by the base station, for example, receives a paging message without using the control channel.

That the MTC device receives, according to the first transmission configuration, the common message transmitted by the base station may include: When each group of transmission parameters includes the quantity of the narrow bands used to send the common message, the MTC device receives the common message on one or more narrow bands according to a requirement. For example, according to one or more parameters of an MTC device identifier, a cell ID, a paging moment, or a quantity of narrow bands for a common message, the MTC device receives a paging message for the MTC device on one or more different narrow bands. For example, the base station may determine a narrow band according to a parameter, and send a paging message or a RAR message specific to a particular MTC device on the narrow band determined by the base station. The MTC device may also determine a narrow band according to the same process, and send a paging message or a RAR message specific to the MTC device on the determined narrow band.

That the MTC device receives, according to the first transmission configuration, the common message transmitted by the base station may include: When each group of transmission parameters includes the location of the narrow band used to send the common message, the MTC device receives the common message on one or more narrow bands according to a requirement. For example, according to one or more parameters of an MTC device identifier, a cell ID, or a paging moment, the MTC device determines one or more narrow bands of the MTC device for receiving a paging message and receives the paging message for the MTC device on the narrow band determined by the MTC device. For example, the base station may determine a narrow band according to a parameter, and send a paging message or a RAR message specific to a particular MTC device on the narrow band determined by the base station. The MTC device may also determine a narrow band according to the same process, and send a paging message or a RAR message specific to the MTC device on the determined narrow band.

That the MTC device receives, according to the first transmission configuration, the common message transmitted by the base station may include: When each group of transmission parameters includes the largest transport block size for sending the common message, a transport block size of the common message received by the MTC device does not exceed the largest transport block size. For example, the MTC device may receive, at a paging moment of the MTC device itself, a paging message by using a largest transport block size corresponding to the paging moment.

Further, the largest transport block size in the transmission parameters includes a maximum quantity of MTC device identifiers that can be included in the common message.

Optionally, in an embodiment, that an MTC device determines a first transmission configuration includes: The MTC device receives the first transmission configuration sent by the base station.

Optionally, in another embodiment, the first transmission configuration may further be preset in the MTC device.

To help a person skilled in the art to better understand the present invention, the present invention is further described below with reference to a specific embodiment. It should be understood that, the specific embodiment is merely used to help better understand the technical solutions of the present invention, but is not intended to limit the technical solutions of the present invention.

Figure 3:
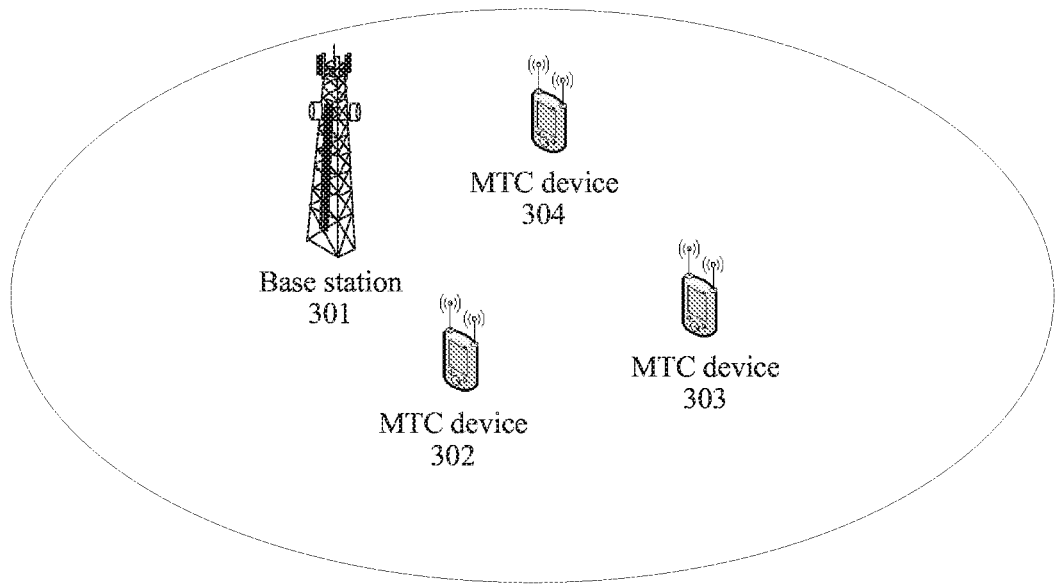
FIG. 3 is a schematic diagram of an M2M communications system.

FIG. 3 is a schematic diagram of an M2M communications system. As shown in FIG. 3, a communications system 300 includes a base station 301 and a target MTC device (including an MTC device 302, an MTC device 303, and an MTC device 304).

The base station 301 may determine a first transmission configuration, so as to send a common message to the target MTC device according to the first transmission configuration. The first transmission configuration may include at least one group of transmission parameters and a moment for using each group of transmission parameters.

Specifically, each group of transmission parameters determined by the base station 301 may include one or more of the following parameters: a quantity of narrow bands used to send the common message, a location of a narrow band used to send the common message, or a largest supported transport block size and a control channel scheduling indication that are used to send the common message. The control channel scheduling indication is used to indicate whether to use a control channel to schedule and send the common message. The base station may adjust, according to a sending requirement of the common message, the quantity of the narrow bands used to send the common message, the location of the narrow band used to send the common message, or the largest supported transport block size used to send the common message. For example, if many MTC devices need to be paged at a paging moment 1, and a paging message needs to carry a large quantity of MTC device identifiers, the base station may use a large paging message TBS to send the paging message, so that the paging message can include the large quantity of MTC device identifiers. In contrast, if few MTC devices need to be paged at a paging moment 2, the base station may use a small paging message TBS to send a paging message, so that the paging message may include a small quantity of MTC device identifiers. With a same coverage enhancement requirement, a larger transport block size used indicates a larger quantity of repetitions available for the common message, and a smaller transport block size used indicates a smaller quantity of repetitions available for the common message.

Similarly, a larger quantity of the narrow bands used to send the common message indicates a larger quantity of common messages that can be sent, for example, a larger quantity of paging messages or RAR messages of UE that can be sent. A smaller quantity of the narrow bands used to send the common message indicates a smaller quantity of common messages that can be sent, for example, a smaller quantity of paging messages or RAR messages of UE that can be sent.

Further, the largest transport block size includes a maximum quantity of MTC device identifiers that can be included in the common message. Specifically, one RAR message may include RAR messages of multiple MTC devices. One paging message may also include paging messages of multiple MTC devices. Therefore, the largest transport block size for sending the common message may be determined by determining the maximum quantity of MTC device identifiers that are included in the common message. The quantity of MTC devices may be determined by using MTC device identifiers that are included in the common message.

A person skilled in the art should understand that, a method for determining the location of the narrow band used to send the common message may be determining a location of each narrow band in multiple narrow bands, or determining a rule, such as a starting location of a narrow band or a distance between locations of two narrow bands. Therefore, the location of each narrow band may be determined according to a determined rule. Further, the location of the narrow band occupied by the common message may be fixed or unfixed. In other words, which narrow band should be used at a particular moment to send the common message may be certain or uncertain. If the location of the narrow band occupied by the common message is fixed, a location of a particular narrow band is used at a particular moment to send the common message. For example, a narrow band 1 may be used at a moment 1 to send the common message, and a narrow band 2 may be used at a moment 2 to send the common message. If the location of the narrow band occupied by the common message is unfixed, the location of the narrow band occupied by the common message is related to related parameters (such as an MTC device identifier) of the MTC device. For example, the location of the narrow band used to send the common message to the MTC device may be determined from locations of multiple determined narrow bands according to the MTC device identifier.

After determining one or more groups of transmission parameters, the base station 301 may determine the moment for using each group of transmission parameters to send the common message, and use the transmission parameters at a corresponding moment to send the common message.

Specifically, the base station may determine a moment at which the control channel scheduling indication in the transmission parameters is positive (that is, indicating that the control channel is used to send the common message). The base station may further determine a moment at which the control channel scheduling indication in the transmission parameters is negative (that is, indicating that the control channel is not used to send the common message). The base station may further determine a moment for using a transmission parameter other than the control channel scheduling indication in the transmission parameters.

Further, when another transmission parameter (such as the quantity of the narrow bands, the location of the narrow band, or the largest transport block size) is used, the base station may further designate a particular moment for each transmission parameter. For example, the base station 301 may determine a default parameter, a particular parameter, a moment for using the default parameter to send the common message, and a moment for using the particular parameter to send the common message. For example, the base station 301 may determine that the default parameter is using five narrow bands to send the common message, and determine that the particular parameter is using two narrow bands to send the common message. In addition, the base station determines that the default parameter is used at a moment 1, a moment 2, and a moment 5, and the particular parameter is used at a moment 3 and a moment 4. In this case, the base station uses the five narrow bands to send the common message at the moment 1, and uses the two narrow bands to send the common message at the moment 4. The base station 301 may further determine multiple different particular parameters and a moment for using a corresponding parameter to send the common message. For example, the base station 301 may determine to use one narrow band to send the common message at a moment 1, use two narrow bands to send the common message at a moment 2, and use three narrow bands to send the common message at a moment 3. In this way, the base station 301 may use a particular quantity of narrow bands (for example, three narrow bands) to send the common message at a particular moment (for example, the moment 3). It can be understood that, a relationship between a value of a transmission parameter and a moment for using the transmission parameter to send a common message may be directly determined (for example, one narrow band is used at a moment 1), or may be calculated by using a particular relationship (for example, 2n narrow bands are used at a moment n). For another example, the base station 301 may determine that the default parameter is the largest transport block size used to send the common message and is 400 bits, and determine that the particular parameter is the largest transport block size used to send the common message and is 200 bits. In addition, the base station determines that the default parameter is used at a moment 1, a moment 2, and a moment 5, and the particular parameter is used at a moment 3 and a moment 4. In this case, the base station uses 400 bits at most to send the common message at the moment 1, and uses 200 bits at most to send the common message at the moment 4. The base station 301 may further determine multiple different particular parameters and a moment for using a corresponding parameter to send the common message. For example, the base station 301 may determine that a largest transport block size used to send the common message at a moment 1 is 200 bits, a largest transport block size used to send the common message at a moment 2 is 400 bits, and a largest transport block size used to send the common message at a moment 3 is 800 bits. In this way, the base station 301 may use a particular largest transport block size (for example, 800 bits) to send the common message at a particular moment (for example, the moment 3). It can be understood that, a relationship between a value of a parameter and a moment for using the parameter to send a common message may be directly determined (for example, 1 bit is used at a moment 1), or may be calculated by using a particular relationship (for example, 2n bits are used at a moment n, and n is a positive integer).

In addition, it can be understood that, the moment for using each group of transmission parameters may be broadly understood as timing for using each group of transmission parameters, or may be broadly understood as a trigger condition for using each group of transmission parameters. For example, if a moment satisfies a condition, for example, the moment satisfies a particular relationship, a corresponding transmission parameter is used to send the common message. For example, when a moment is odd-numbered, a transmission parameter may be used; when a moment is an even-numbered, another transmission parameter may be used. For another example, if a transmission parameter is specified to be used at a moment, the transmission parameter is used at the moment; if no transmission parameter is specified to be used at another moment, a default transmission parameter may be used at the moment.

After determining the first transmission configuration, the base station 301 may send the common message to the target MTC device according to the first transmission configuration. Specifically, the base station may send, at a moment at which the control channel scheduling indication in the transmission parameters used in the first transmission configuration is positive, the common message to the target MTC device by using the control channel. The base station may further send, at a moment at which the control channel scheduling indication in the transmission parameters in the first transmission configuration is negative, the common message to the target MTC device without using the control channel. The base station may further use, according to a moment for using another transmission parameter (such as the quantity of the narrow bands, the location of the narrow band, or the largest transport block size) to send the common message, the corresponding transmission parameter to send the common message to the target MTC device. Further, the base station 301 may further send the first transmission configuration to the target MTC device, so that the target MTC device can receive the common message according to the first transmission configuration. Specifically, the base station 301 may directly send the first transmission configuration to the target MTC device. Alternatively, the base station 301 may further broadcast the first transmission configuration to all MTC devices in a serving range by means of broadcasting. In this way, the target MTC device can also receive the first transmission configuration sent by the base station 301.

Specifically, the MTC device 302 is used an example. If the common message is a paging message, the MTC device 302 may calculate its own moment at which the common message is sent (that is, a paging moment), and determine, according to the first transmission configuration, how to receive the paging message. If the MTC device 302 determines, according to the transmission parameters in the first transmission configuration, to receive the paging message at the paging moment by using the control channel, the MTC device 302 receive the paging message by using the control channel. If the MTC device determines, according to the transmission parameters in the first transmission configuration, to use another transmission parameter (such as the quantity of the narrow bands, the location of the narrow band, or the largest transport block size) to receive the paging message at the transmission moment, the MTC device 302 can determine a corresponding transmission parameter, for example, determine a quantity of to-be-used narrow bands and a largest supported transport block size for the paging moment. In this way, the MTC device 302 can receive, according to the largest supported transport block size or the quantity of the to-be-used narrow bands, the paging message sent by the base station 301.

Optionally, in an embodiment, the base station 301 may collect statistics about related information (for example, a quantity of MTC devices and a paging moment) of the target MTC device according to a first time granularity. The base station 301 may determine the first transmission configuration according to a statistical result. The first time granularity may be a time interval for sending the common message.

Further, the base station 301 may further update the determined first transmission configuration. Specifically, the base station 301 may collect the statistics about the related information (for example, the quantity of MTC devices and the paging moment) of the target MTC device according to the first time granularity. The base station 301 may update the first transmission configuration according to the statistical result. Updating the first transmission configuration may be updating the moment for using the control channel to send the common message, or may be updating the moment for using the transmission parameters to send the common message, or may be updating the transmission parameters, for example, increasing or decreasing the quantity of the narrow bands and increasing or decreasing the largest supported transport block size. Then, according to an updated first transmission configuration, the control channel or the transmission parameters are used to send the common message to the target MTC device. For example, if a quantity of target MTC devices is increased, the quantity of the narrow bands or the largest supported transport block size may be increased. If the quantity of target MTC devices is decreased, the quantity of the narrow bands or the largest supported transport block size may be decreased.

Figure 4:
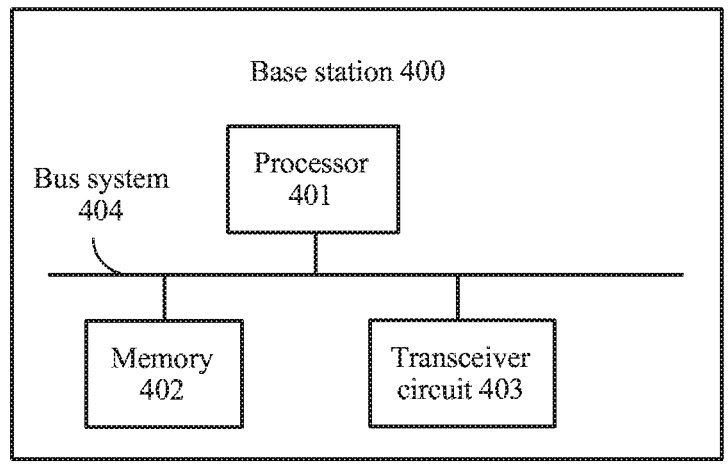
FIG. 4 is a structural block diagram of a base station according to an embodiment of the present invention.

FIG. 4 is a structural block diagram of a base station according to an embodiment of the present invention. A base station 400 shown in FIG. 4 includes a processor 401, a memory 402, and a transceiver circuit 403.

Components of the base station 400 are coupled together by using a bus system 404. In addition to a data bus, the bus system 404 further includes a power bus, a control bus, and a status signal bus. However, for clarity of description, various buses are marked as the bus system 404 in FIG. 4.

The methods disclosed in the foregoing embodiments of the present invention may be applied to the processor 401, or be implemented by the processor 401. The processor 401 may be an integrated circuit chip, and has a signal processing capability. In an implementation process, the steps in the foregoing methods may be completed by means of an integrated logic circuit of hardware in the processor 401 or an instruction in a form of software. The foregoing processor 401 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor 410 can implement or perform methods, steps, and logical block diagrams disclosed in the embodiments of the present invention. The general-purpose processor may be a microprocessor, or the processor may be any normal processor, or the like. The steps of the methods disclosed with reference to the embodiments of the present invention may be directly performed and completed by a hardware decoding processor, or performed and completed by a combination of hardware and software modules in a decoding processor. The software module may be located in a mature storage medium in the art, such as a random access memory (RAM), a flash memory, a read-only memory (ROM), a programmable read-only memory or an electrically erasable programmable memory, or a register. The storage medium is located in the memory 402. The processor 401 reads an instruction from the memory 402, and completes the steps of the foregoing methods in combination with the hardware of the processor.

The processor 401 is configured to determine a first transmission configuration, where the first transmission configuration includes one or more groups of transmission parameters and a moment for using each group of transmission parameters, each group of transmission parameters includes one or more of the following parameters: a quantity of narrow bands used to send a common message, a location of a narrow band used to send the common message, and a largest transport block size and a control channel scheduling indication that are used to send the common message, and the control channel scheduling indication is used to indicate whether to use a control channel to schedule and send the common message.

The transceiver circuit 403 is configured to transmit the common message to a target machine type communication (MTC) device according to the first transmission configuration.

The base station shown in FIG. 4 can determine a manner and a parameter that are used to send the common message at a different moment. For example, different transmission parameters may be used at different moments to send the common message. For example, the base station can determine the quantity of the narrow bands used to send the common message, the location of the narrow band used to send the common message, the largest transport block size for sending the common message, whether to use the control channel to schedule and send the common message, or the like. Therefore, the base station can flexibly control sending of the common message.

Specifically, the transceiver circuit 403 is configured to: when the control channel scheduling indication in each group of transmission parameters is positive, send, according to a moment for sending the common message in each group of transmission parameters, the common message to the target MTC device by using the control channel; or when the control channel scheduling indication in each group of transmission parameters is negative, send the common message to the target device without using the control channel, for example, send a paging message without using the control channel.

The transceiver circuit 403 is configured to: when each group of transmission parameters includes the quantity of the narrow bands used to send the common message, send the common message on multiple narrow bands according to a requirement. For example, according to one or more parameters of an MTC device identifier, a cell identifier (ID), a paging moment, or a quantity of narrow bands for a common message, the transceiver circuit 403 sends paging messages for different MTC devices on multiple different narrow bands.

The transceiver circuit 403 is configured to: when each group of transmission parameters includes the location of the narrow band used to send the common message, send the common message on multiple narrow bands according to a requirement. For example, according to one or more parameters of an MTC device identifier, a cell ID, or a paging moment, the base station determines a narrow band for sending a paging message for an MTC device and sends the paging message for the MTC device on the narrow band determined by the transceiver circuit 403.

The transceiver circuit 403 is configured to: when each group of transmission parameters includes the largest transport block size for sending the common message, ensure that a transport block size of the common message does not exceed the largest transport block size. For example, the base station ensures that a transport block size of a paging message does not exceed the largest transport block size.

Specifically, the largest transport block size in the transmission parameters includes a maximum quantity of MTC device identifiers that can be included in the common message.

Further, the transceiver circuit 403 is further configured to send the first transmission configuration to the target MTC device, so that the target MTC device can receive the common message according to the first transmission configuration.

Further, the processor 401 is further configured to collect statistics about related information of the target MTC device according to a first time granularity; and the processor 401 is configured to determine the first transmission configuration according to a statistical result.

Figure 5:
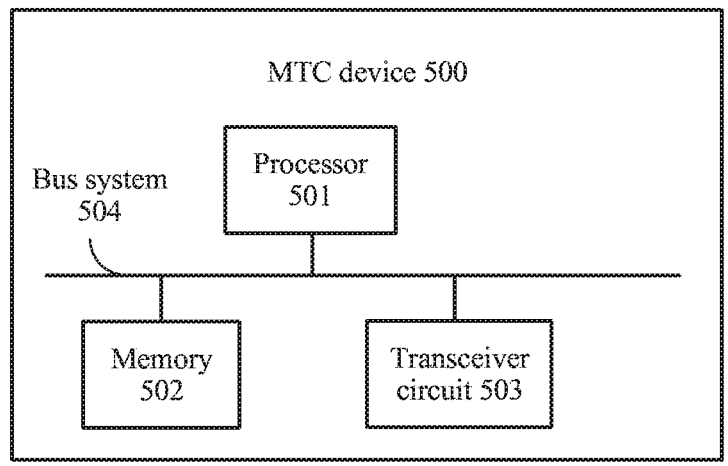
FIG. 5 is a structural block diagram of an MTC device according to an embodiment of the present invention.

FIG. 5 is a structural block diagram of an MTC device according to an embodiment of the present invention. An MTC device 500 shown in FIG. 5 includes a processor 501, a memory 502, and a transceiver circuit 503.

Components of the MTC device 500 are coupled together by using a bus system 504. In addition to a data bus, the bus system 504 further includes a power bus, a control bus, and a status signal bus. However, for clarity of description, various buses are marked as the bus system 504 in FIG. 5.

The methods disclosed in the foregoing embodiments of the present invention may be applied to the processor 501, or be implemented by the processor 501. The processor 501 may be an integrated circuit chip, and has a signal processing capability. In an implementation process, the steps in the foregoing methods may be completed by means of an integrated logic circuit of hardware in the processor 501 or an instruction in a form of software. The foregoing processor 501 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor 510 may implement or perform methods, steps, and logical block diagrams disclosed in the embodiments of the present invention. The general-purpose processor may be a microprocessor, or the processor may be any normal processor, or the like. The steps of the methods disclosed with reference to the embodiments of the present invention may be directly performed and completed by a hardware decoding processor, or performed and completed by a combination of hardware and software modules in a decoding processor. The software module may be located in a mature storage medium in the art, such as a random access memory (RAM), a flash memory, a read-only memory (ROM), a programmable read-only memory or an electrically erasable programmable memory, or a register. The storage medium is located in the memory 502. The processor 501 reads an instruction from the memory 502, and completes the steps of the foregoing methods in combination with the hardware of the processor.

The processor 501 is configured to determine a first transmission configuration, where the first transmission configuration includes one or more groups of transmission parameters and a moment for using each group of transmission parameters, a control channel indication is used to indicate whether a base station uses a control channel to send a common message, the transmission parameters include one or more of the following parameters: a quantity of narrow bands used by the base station to send the common message, a location of a narrow band used by the base station to send the common message, and a largest transport block size and a control channel scheduling indication that are used by the base station to send the common message, and the control channel indication is used to indicate whether the base station uses the control channel to schedule and send the common message.

The transceiver circuit 503 is configured to receive, according to the first transmission configuration, the common message sent by the base station.

The MTC device shown in FIG. 5 can determine, according to the first transmission configuration, a manner and a parameter that are used by the base station to send the common message, so that the base station can determine the manner used to send the common message at a different moment and the transmission parameter used to send the common message. Therefore, transmission of the common message is more flexible.

The transceiver circuit 503 is configured to: when the control channel indication in each group of transmission parameters is positive, receive, by using the control channel, the common message sent by the base station, for example, receive a paging message by using the control channel; or when the control channel indication in each group of transmission parameters is negative, receive, without using the control channel, the common message sent by the base station, for example, receive a paging message without using the control channel.

The transceiver circuit 503 is configured to: when each group of transmission parameters includes the quantity of the narrow bands used to send the common message, receive the common message on one or more narrow bands according to a requirement. For example, according to one or more parameters of an MTC device identifier, a cell ID, a paging moment, or a quantity of narrow bands for a common message, the transceiver circuit 503 receives a paging message for the MTC device on one or more different narrow bands. For example, the base station may determine a narrow band according to a parameter, and send a paging message or a RAR message specific to a particular MTC device on the narrow band determined by the base station. The transceiver circuit 503 may also determine a narrow band according to the same process, and receive a paging message or a RAR message specific to the MTC device on the determined narrow band.

The transceiver circuit 503 is configured to: when each group of transmission parameters includes the location of the narrow band used to send the common message, receive the common message on one or more narrow bands according to a requirement. For example, according to one or more parameters of an MTC device identifier, a cell ID, or a paging moment, the transceiver circuit 503 determines one or more narrow bands of the MTC device for receiving a paging message and receives the paging message for the MTC device on the narrow band determined by the transceiver circuit 503. For example, the base station may determine a narrow band according to a parameter, and send a paging message or a RAR message specific to a particular MTC device on the narrow band determined by the base station. The transceiver circuit 503 may also determine a narrow band according to the same process, and receive a paging message or a RAR message specific to the MTC device on the determined narrow band.

The transceiver circuit 503 is configured to: when each group of transmission parameters includes the largest transport block size for sending the common message, ensure that a transport block size of the received common message does not exceed the largest transport block size. For example, the transceiver circuit 503 may receive, at a paging moment of the MTC device itself, a paging message by using a largest transport block size corresponding to the paging moment.

Specifically, the largest transport block size in the transmission parameters includes a maximum quantity of MTC device identifiers that can be included in the common message.

Optionally, in an embodiment, the processor 501 is configured to determine that the first transmission configuration is the first transmission configuration that is sent by the base station and received by the transceiver circuit 503.

Figure 6:
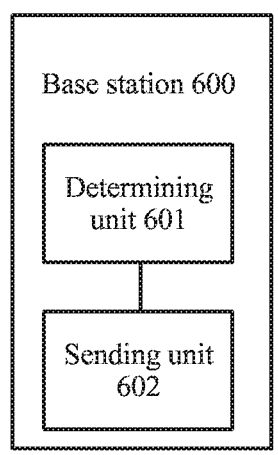
FIG. 6 is a structural block diagram of a base station according to an embodiment of the present invention.

FIG. 6 is a structural block diagram of a base station according to an embodiment of the present invention. A base station 600 shown in FIG. 6 includes a determining unit 601 and a sending unit 602.

The determining unit 601 is configured to determine a first transmission configuration, where the first transmission configuration includes one or more groups of transmission parameters and a moment for using each group of transmission parameters, each group of transmission parameters includes one or more of the following parameters: a quantity of narrow bands used to send a common message, a location of a narrow band used to send the common message, and a largest transport block size and a control channel scheduling indication that are used to send the common message, and the control channel scheduling indication is used to indicate whether to use a control channel to schedule and send the common message.

The sending unit 602 is configured to transmit the common message to a target machine type communication (MTC) device according to the first transmission configuration.

The base station shown in FIG. 6 can determine a manner and a parameter that are used to send the common message at a different moment. For example, different transmission parameters may be used at different moments to send the common message. For example, the base station can determine the quantity of the narrow bands used to send the common message, the location of the narrow band used to send the common message, the largest transport block size for sending the common message, whether to use the control channel to schedule and send the common message, or the like. Therefore, the base station can flexibly control sending of the common message.

Specifically, the sending unit 602 is configured to: when the control channel scheduling indication in each group of transmission parameters is positive, send, according to a moment for sending the common message in each group of transmission parameters, the common message to the target MTC device by using the control channel; or when the control channel scheduling indication in each group of transmission parameters is negative, send the common message to the target device without using the control channel, for example, send a paging message without using the control channel.

The sending unit 602 is configured to: when each group of transmission parameters includes the quantity of the narrow bands used to send the common message, send the common message on multiple narrow bands according to a requirement. For example, according to one or more parameters of an MTC device identifier, a cell identifier (ID), a paging moment, or a quantity of narrow bands for a common message, the sending unit 602 sends paging messages for different MTC devices on multiple different narrow bands.

The sending unit 602 is configured to: when each group of transmission parameters includes the location of the narrow band used to send the common message, send the common message on multiple narrow bands according to a requirement. For example, according to one or more parameters of an MTC device identifier, a cell ID, or a paging moment, the sending unit 602 determines a narrow band for sending a paging message for an MTC device and sends the paging message for the MTC device on the narrow band determined by the sending unit 602.

The sending unit 602 is configured to: when each group of transmission parameters includes the largest transport block size for sending the common message, ensure that a transport block size of the common message does not exceed the largest transport block size. For example, the base station ensures that a transport block size of a paging message does not exceed the largest transport block size.

Specifically, the largest transport block size in the transmission parameters includes a maximum quantity of MTC device identifiers that can be included in the common message.

Further, the sending unit 602 is further configured to send the first transmission configuration to the target MTC device, so that the target MTC device can receive the common message according to the first transmission configuration.

Further, the determining unit 601 is further configured to collect statistics about related information of the target MTC device according to a first time granularity; and the determining unit 601 is configured to determine the first transmission configuration according to a statistical result.

Figure 7:
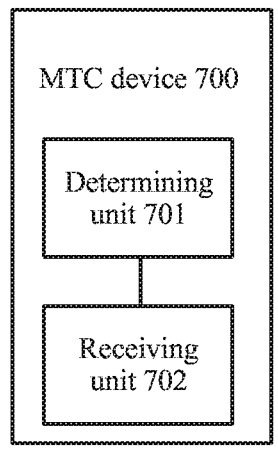
FIG. 7 is a structural block diagram of an MTC device according to an embodiment of the present invention.

FIG. 7 is a structural block diagram of an MTC device according to an embodiment of the present invention. An MTC device 700 shown in FIG. 7 includes a determining unit 701 and a receiving unit 702.

The determining unit 701 is configured to determine a first transmission configuration, where the first transmission configuration includes one or more groups of transmission parameters and a moment for using each group of transmission parameters, the transmission parameters include one or more of the following parameters: a quantity of narrow bands used by a base station to send a common message, a location of a narrow band used by the base station to send the common message, and a largest transport block size and a control channel scheduling indication that are used by the base station to send the common message, and a control channel indication is used to indicate whether the base station uses a control channel to schedule and send the common message.

The receiving unit 702 is configured to receive, according to the first transmission configuration, the common message sent by the base station.

The MTC device shown in FIG. 7 can determine, according to the first transmission configuration, a manner and a parameter that are used by the base station to send the common message, so that the base station can determine the manner used to send the common message at a different moment and the transmission parameter used to send the common message. Therefore, transmission of the common message is more flexible.

The receiving unit 702 is configured to: when the control channel indication in each group of transmission parameters is positive, receive, by using the control channel, the common message sent by the base station, for example, receive a paging message by using the control channel; or when the control channel indication in each group of transmission parameters is negative, receive, without using the control channel, the common message sent by the base station, for example, receive a paging message without using the control channel.

The receiving unit 702 is configured to: when each group of transmission parameters includes the quantity of the narrow bands used to send the common message, receive the common message on one or more narrow bands according to a requirement. For example, according to one or more parameters of an MTC device identifier, a cell ID, a paging moment, or a quantity of narrow bands for a common message, the receiving unit 702 receives a paging message for the MTC device on one or more different narrow bands. For example, the base station may determine a narrow band according to a parameter, and send a paging message or a RAR message specific to a particular MTC device on the narrow band determined by the base station. The receiving unit 702 may also determine a narrow band according to the same process, and receive a paging message or a RAR message specific to the MTC device on the determined narrow band.

The receiving unit 702 is configured to: when each group of transmission parameters includes the location of the narrow band used to send the common message, receive the common message on one or more narrow bands according to a requirement. For example, according to one or more parameters of an MTC device identifier, a cell ID, or a paging moment, the receiving unit 702 determines one or more narrow bands of the MTC device for receiving a paging message and receives the paging message for the MTC device on the narrow band determined by the receiving unit 702. For example, the base station may determine a narrow band according to a parameter, and send a paging message or a RAR message specific to a particular MTC device on the narrow band determined by the base station. The receiving unit 702 may also determine a narrow band according to the same process, and receive a paging message or a RAR message specific to the MTC device on the determined narrow band.

The receiving unit 702 is configured to: when each group of transmission parameters includes the largest transport block size for sending the common message, ensure that a transport block size of the received common message does not exceed the largest transport block size. For example, the transceiver circuit 702 may receive, at a paging moment of the MTC device itself, a paging message by using a largest transport block size corresponding to the paging moment.

Specifically, the largest transport block size in the transmission parameters includes a maximum quantity of MTC device identifiers that can be included in the common message.

Optionally, in an embodiment, the determining unit 701 is configured to determine that the first transmission configuration is the first transmission configuration that is sent by the base station and received by the receiving unit 702.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:
1. A base station comprising:
a memory storing instructions;

a processor in communication with the memory, wherein the processor is configured to execute the instructions to:

determine a first transmission configuration, wherein the first transmission configuration comprises a group of transmission parameters and a moment for using the group of transmission parameters, and wherein the group of transmission parameters comprises:

a control channel scheduling indication indicating whether to use a control channel to schedule and send a common message, the control channel scheduling indication being positive when the control channel is to schedule and send the common message and negative when the control channel is not to schedule and send the common message, and a location of one or more narrow bands used to send the common message;

transmit within the one or more narrow bands, according to the moment for using the group of transmission parameters, the common message to a terminal device in the control channel when the control channel scheduling indication is positive; and transmit within the one or more narrow bands, the common message to the terminal device without using the control channel when the control channel scheduling indication is negative.

2. The base station according to claim 1, wherein the processor is further configured to execute the instructions to transmit the first transmission configuration to the terminal device.

3. The base station according to claim 1, wherein the processor is further configured to execute the instructions to collect statistics about related information of the terminal device according to a first time granularity; and the processor is configured to execute the instructions to determine the first transmission configuration according to a statistical result.

4. The base station according to claim 1, wherein the group of transmission parameters further comprises a quantity of the one or more narrow bands.

5. The base station according to claim 1, wherein the group of transmission parameters further comprises a maximum transport block size for sending the common message.

6. A terminal device comprising:
a memory storing instructions;
a processor in communication with the memory, wherein the processor is configured to execute the instructions to:

determine a first transmission configuration, wherein the first transmission configuration comprises a group of transmission parameters and a moment for using the group of transmission parameters, wherein the group of transmission parameters comprises:

a control channel scheduling indication indicating whether a control channel is used to schedule and send a common message, the control channel scheduling indication being positive when the control channel is to schedule and send the common message and negative when the control channel is not to schedule and send the common message, and a location of one or more narrow bands used to send the common message;

receive within the one or more narrow bands, according to the moment for using the group of transmission parameters, the common message from a base station in the control channel when the control channel scheduling indication is positive; and receive within the one or more narrow bands, the common message from the base station without using the control channel when the control channel scheduling indication is negative.

7. The device according to claim 6, wherein the processor is further configured to execute the instructions to receive the first transmission configuration from the base station.

8. The terminal device according to claim 6, wherein the group of transmission parameters further comprises a quantity of the one or more narrow bands.

9. The terminal device according to claim 6, wherein the group of transmission parameters further comprises a maximum transport block size for sending the common message.

10. A method for message transmission comprising:
determining, by a base station, a first transmission configuration that comprises a group of transmission parameters and a moment for using the group of transmission parameters, wherein the group of transmission parameters comprises:

a control channel scheduling indication indicating whether to use a control channel to schedule and send common message, the control channel scheduling indication being positive when the control channel is to schedule and send the common message and negative when the control channel is not to schedule and send the common message, and a location of one or more narrow bands used to send the common message;

transmitting within the one or more narrow bands, by the base station, according to the moment for using the group of transmission parameters, the common message to a terminal device in the control channel when the control channel scheduling indication is positive; and transmitting within the one or more narrow bands, by the base station, the common message to the terminal device without using the control channel when the control channel scheduling indication is negative.

11. The method according to claim 10, wherein the method further comprises transmitting, by the base station, the first transmission configuration to the terminal device.

12. The method according to claim 10, wherein the method further comprises collecting, by the base station, statistics about related information of the terminal device according to a first time granularity; and wherein determining, by the base station, the first transmission configuration comprises determining, by the base station, the first transmission configuration according to a statistical result.

13. The method according to claim 10, wherein the group of transmission parameters further comprises a quantity of the one or more narrow bands.

14. The method according to claim 10, wherein the group of transmission parameters further comprises a maximum transport block size for sending the common message.

15. A method for transmitting a common message, wherein the method comprises:

determining, by a terminal device, a first transmission configuration that comprises a group of transmission parameters and a moment for using the group of transmission parameters, wherein the group of transmission parameters comprises:

a control channel scheduling indication indicating whether a control channel is used to schedule and send common message, the control channel scheduling indication being positive when the control channel is to schedule and send the common message and negative when the control channel is not to schedule and send the common message, and a location of one or more narrow bands used to send the common message;

receiving within the one or more narrow bands, by the terminal device according to the moment for using the group of transmission parameters, the common message from a base station in the control channel when the control channel scheduling indication is positive; and receiving within the one or more narrow bands, the common message from the base station without using the control channel when the control channel scheduling indication is negative.

16. The method according to claim 15, wherein the method further comprises receiving the first transmission configuration from the base station.

17. The method according to claim 15, wherein the group of transmission parameters further comprises a quantity of the one or more narrow bands.

18. The method according to claim 15, wherein the group of transmission parameters further comprises a maximum transport block size for sending the common message.

* * * * *